Oct. 9, 1934.  M. G. COPLEN  1,976,160
METHOD AND APPARATUS FOR MOVING TREES
Filed May 11, 1932   6 Sheets-Sheet 6
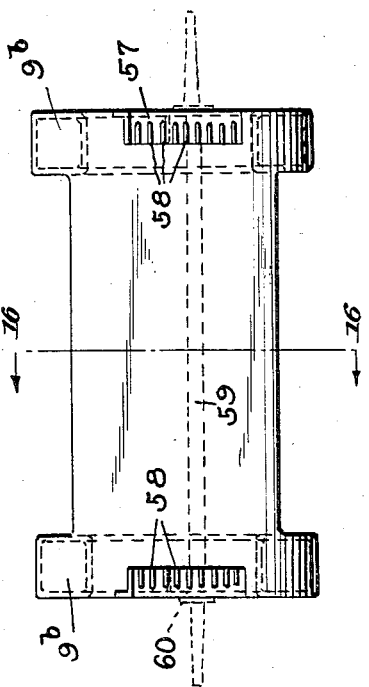
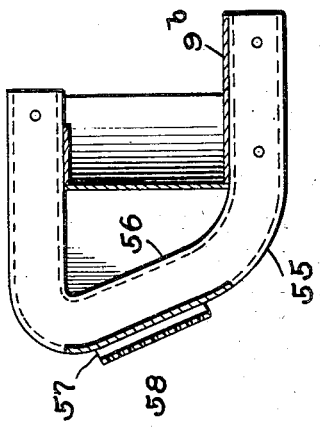
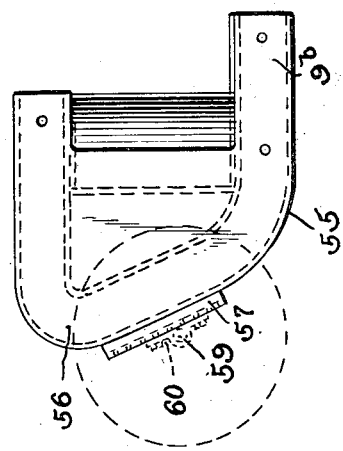

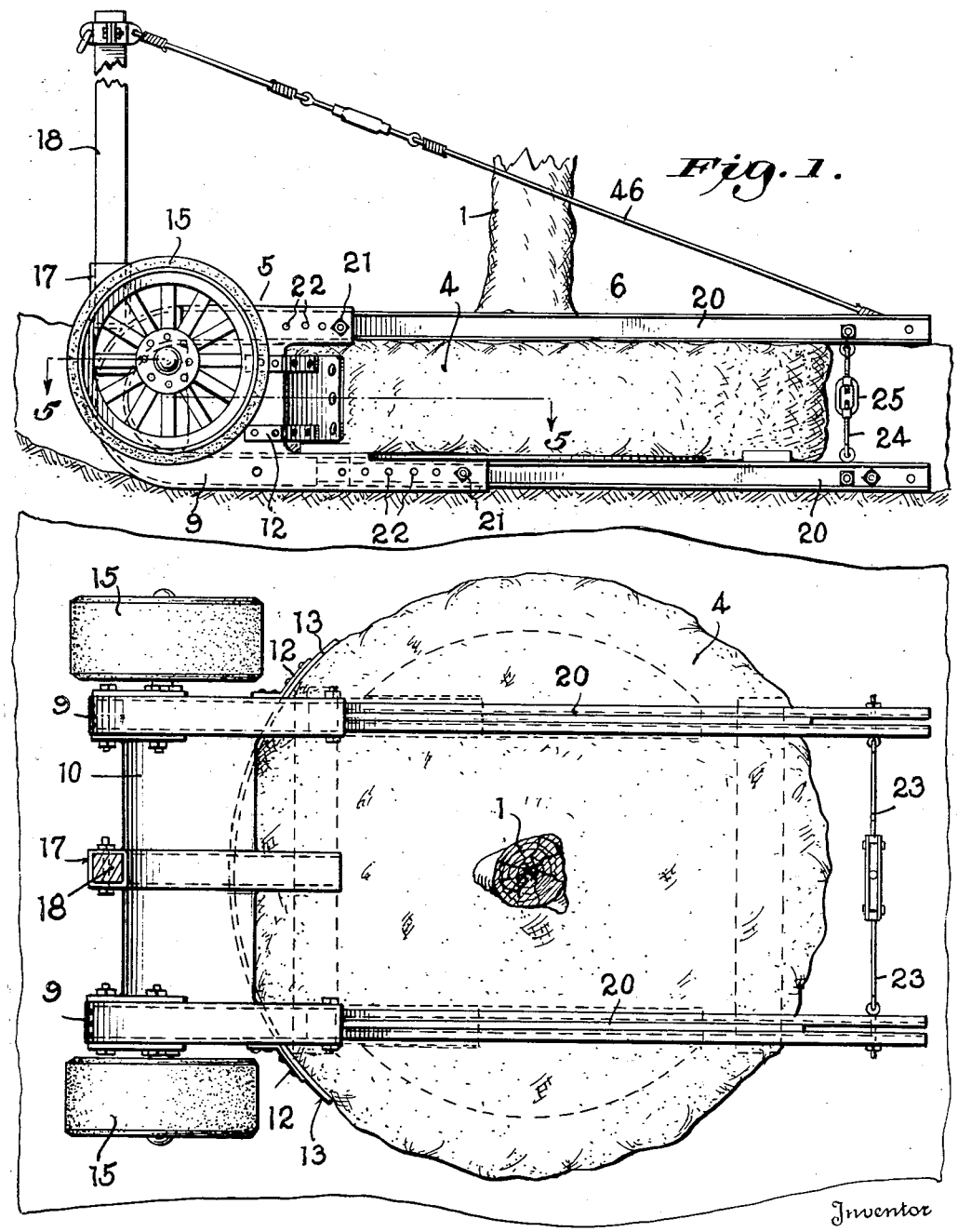

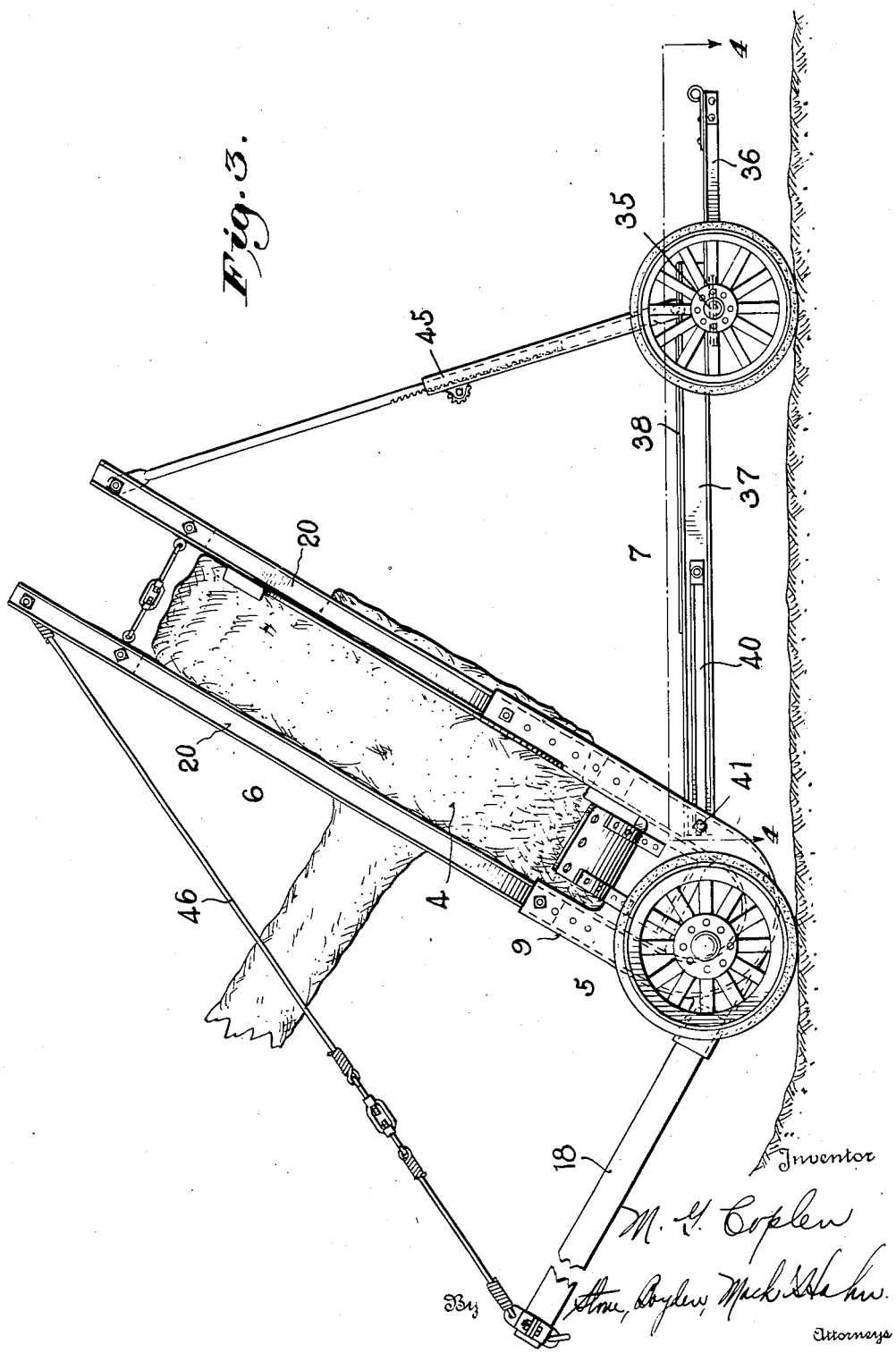

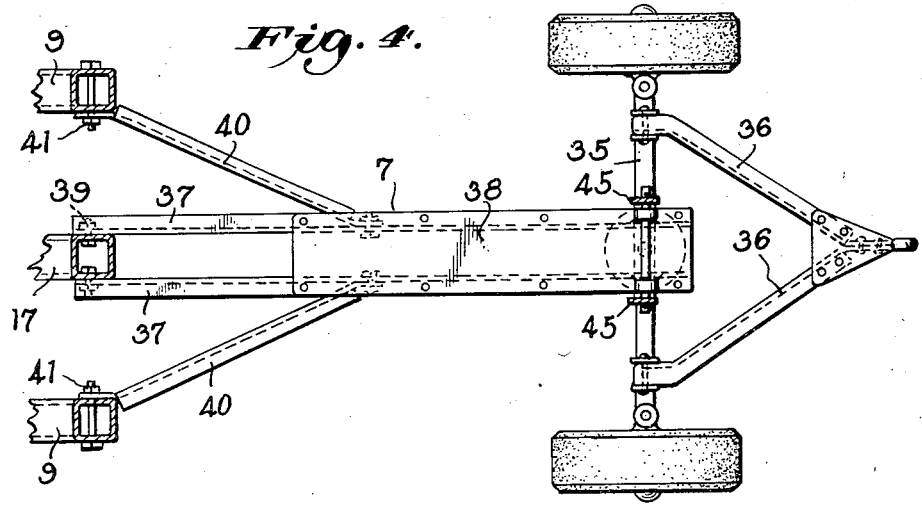
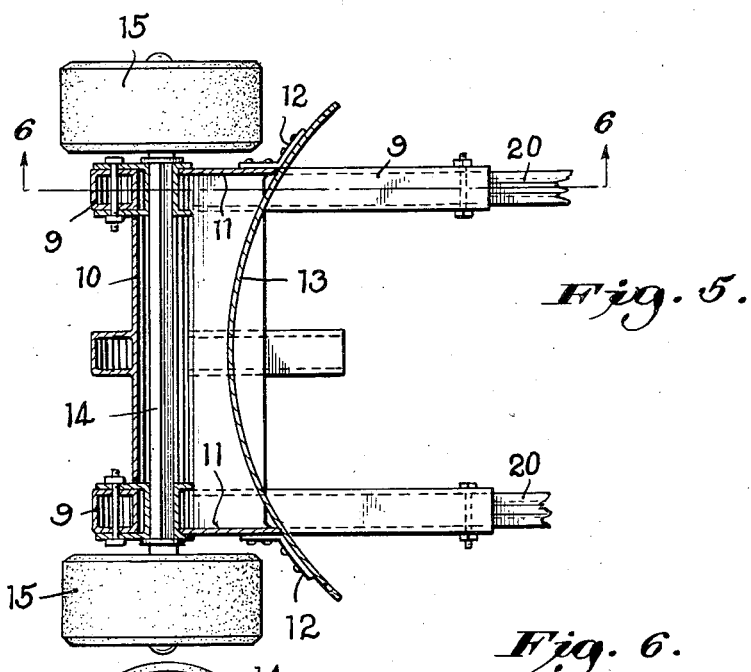
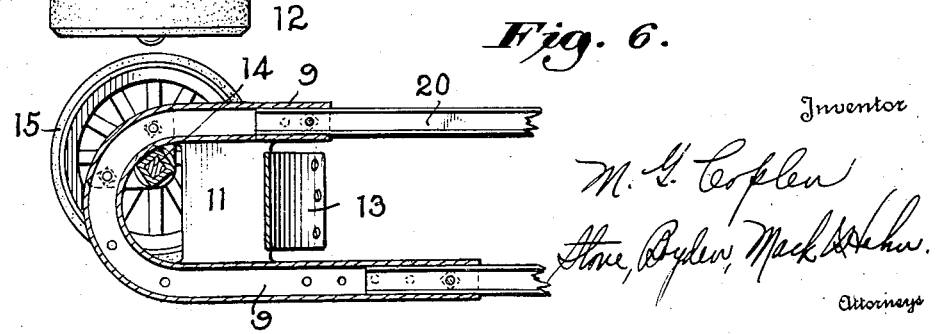

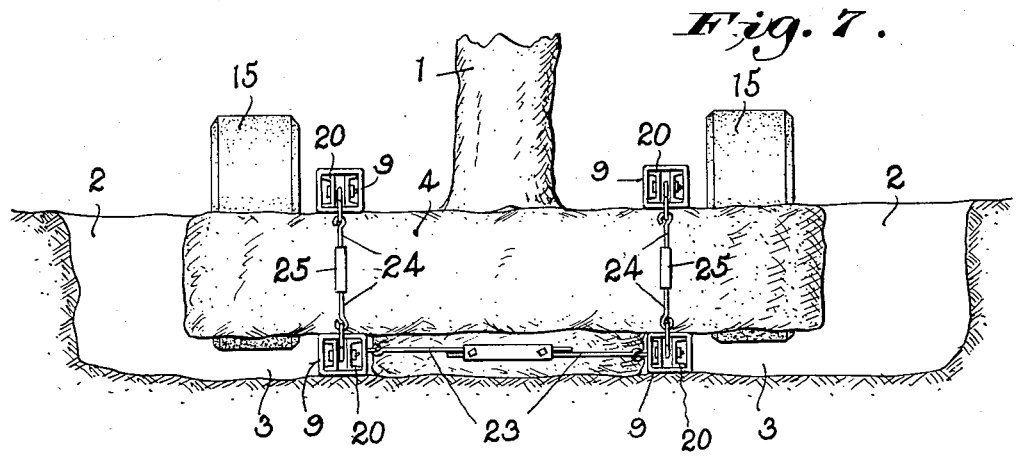
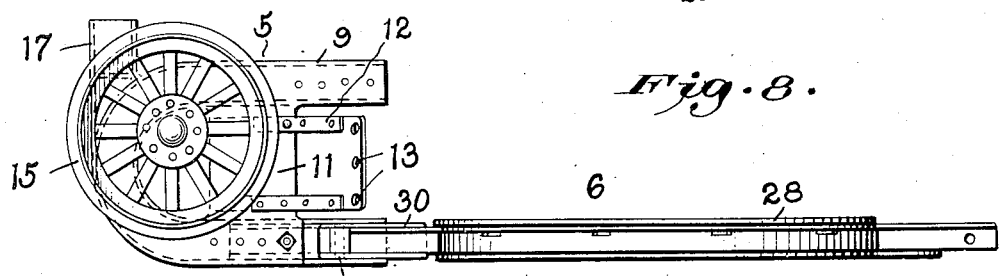
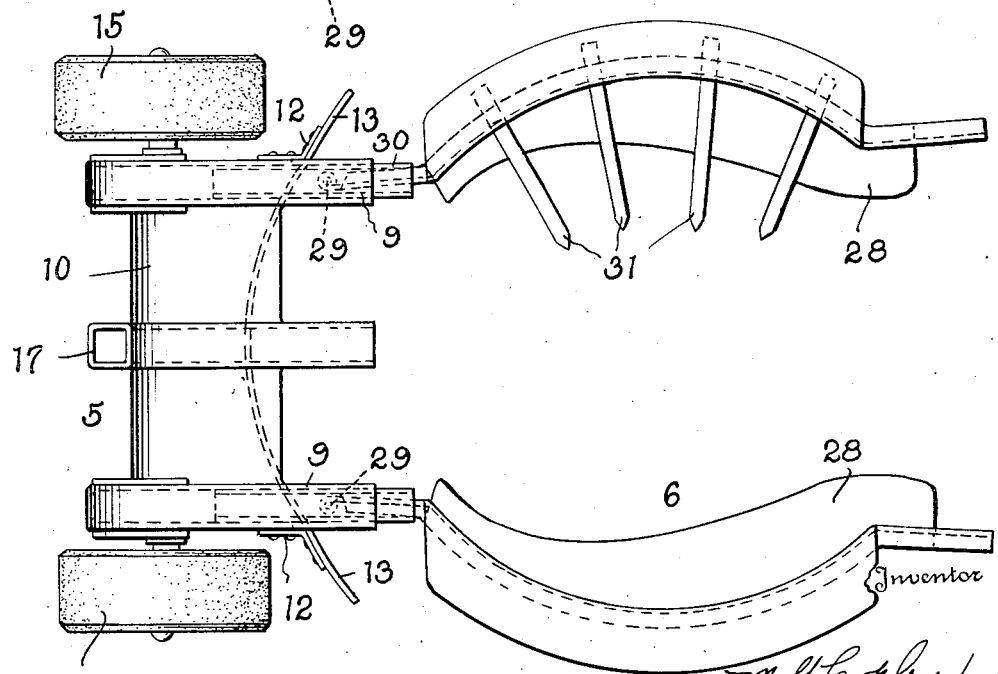

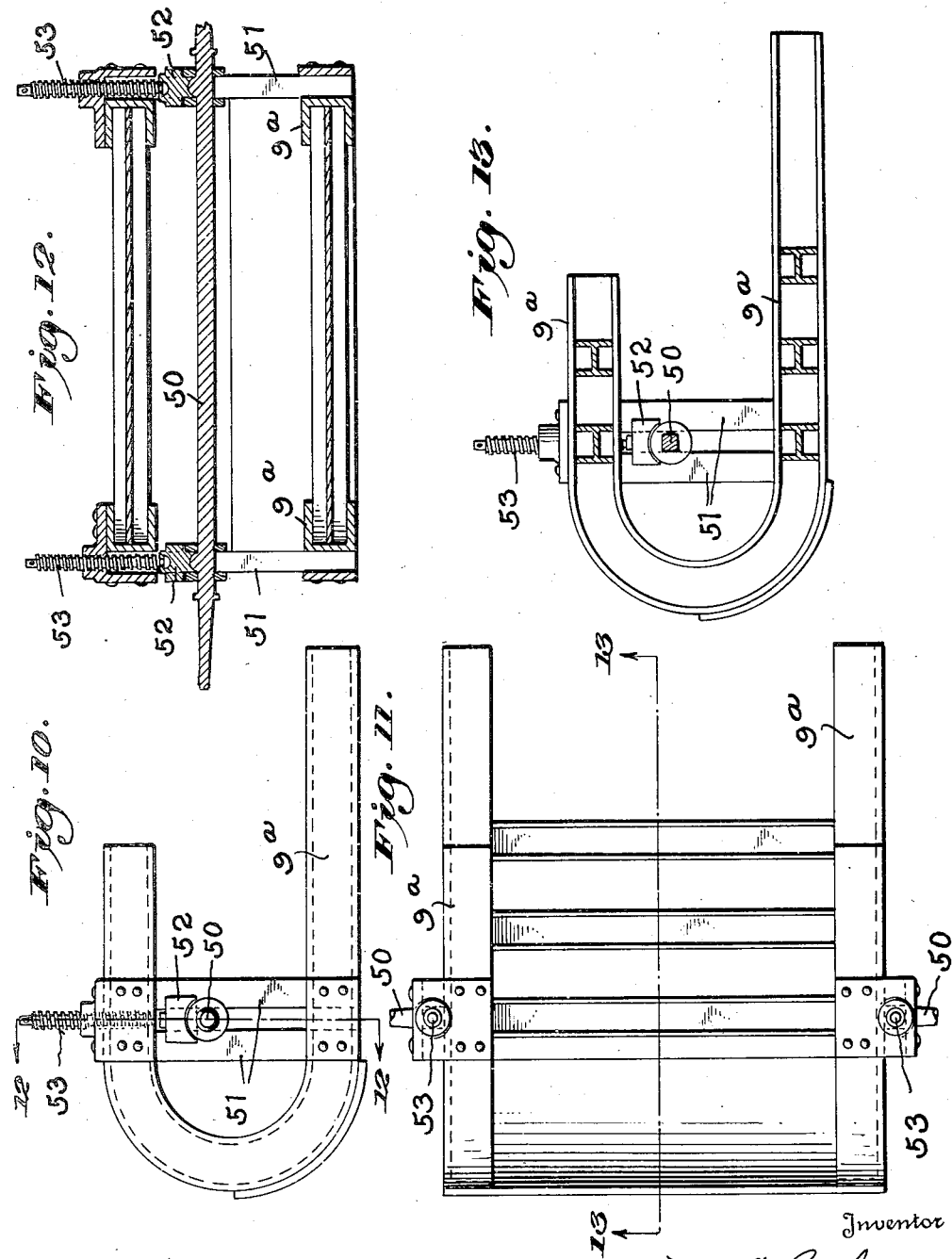

Patented Oct. 9, 1934

1,976,160

UNITED STATES PATENT OFFICE 1,976,160

METHOD AND APPARATUS FOR MOVING TREES

Milo G. Coplen, Rockville, Md.

Application May 11, 1932, Serial No. 610,725

17 Claims. (Cl. 214—3)

This invention relates to a method of, and an apparatus for moving a tree from one location to another.

It is the primary object of the present invention to provide a method of and an apparatus for lifting a tree from the ground and supporting the same on a vehicle entirely by the earth ball surrounding the roots of the tree. In this manner, the tree is transported to its new location and deposited in the place desired without guys, braces or other supports engaging the trunk of the tree and which ordinarily damage the bark and affect the growth of the tree in its new location.

Another object is to provide an apparatus of this character which will permit a relatively large earth ball to be moved with the tree, thereby avoiding the necessity of cutting up close to the tree trunk at one or more points in order to engage the apparatus. By preserving a large earth ball, the root structure is not damaged and the soil conditions are not materially changed in the new location.

A further object is to provide an apparatus of the aforesaid character which shall consist of few parts that are simple in construction and inexpensive to manufacture and which may be easily operated without specially skilled labor.

With the foregoing and other objects in view, the invention may be stated to consist in the various novel features of construction and arrangement or combination, and in the method of moving the tree, all of which will be fully described hereinafter and pointed out in the appended claims.

In the drawings accompanying and forming a part of this application:

Fig. 1 is a side elevation of a portion of an apparatus constructed in accordance with my invention and showing the same in position about the earth ball;

Fig. 2 is a top plan view thereof;

Fig. 3 is a side elevation of the complete apparatus showing the tree in position ready for transportation;

Fig. 4 is a fragmentary top plan view of the forward end of the apparatus;

Fig. 5 is a fragmentary top plan view with parts in section of the rear end of the apparatus;

Fig. 6 is a longitudinal sectional view taken on the line 6—6 of Fig. 5;

Fig. 7 is an end elevation of the apparatus shown in Fig. 1;

Fig. 8 is a side elevation of a modification of my apparatus;

Fig. 9 is a top plan view thereof;

Fig. 10 is a fragmentary side elevation of a modified mounting for the axle;

Fig. 11 is a top plan view thereof;

Fig. 12 is a vertical sectional view taken on the line 12—12 of Fig. 10;

Fig. 13 is a longitudinal sectional view taken on the line 13—13 of Fig. 11;

Fig. 14 is a side elevation of a further modification of mounting for the axle;

Fig. 15 is a rear elevation thereof; and

Fig. 16 is a longitudinal sectional view taken on the line 16—16 of Fig. 15.

Briefly stated, the method of moving a tree consists in first digging a substantially circular trench about the base of the tree to be moved. The diameter and depth of this trench varies with the size of the tree and should be of sufficient diameter and depth to include the major portion of the root structure. This trench is then undercut on opposite sides to permit a pair of lower clamping bars to be inserted beneath the earth ball and when in position, they are drawn toward each other to shear a major portion of the earth beneath the tree. The earth ball is then clamped between upper and lower longitudinal members that are wheel supported and rocked back about the wheel axis to sever the tree ball from the earth, whereupon a forward wheeled structure is coupled to the longitudinal members and the tree may then be towed to its new location. During such operation the tree is supported entirely by the earth ball so that the trunk is not damaged in any manner.

Referring to Figs. 1, 2 and 7, it will be noted that 1 denotes a tree to be moved and 2 a substantially circular trench surrounding the tree and having diametrically opposite undercut portions 3 defining an earth ball 4.

The apparatus for moving the tree comprises a wheel mounted rear section 5, a central clamping section 6 and a forward wheel mounted section 7.

As shown in Figs. 5, 6, 8 and 9, the rear section consists of a pair of U-shaped members 9 arranged in transverse spaced relation, and each of which is hollow and rectangular in cross section. The members 9 are united by a U-shaped wall 10 which abuts and is welded to the inner edge of members 9. Side walls 11 extend between the upper and lower portions of the members 9 and these walls are provided with straps 12 which engage and support an arcuate plate 13 which extends transversely of the rear section and serves as a support for the earth ball to rest on during transportation of the tree. An axle 14 is fastened to the members 9 adjacent the upper rear end thereof at such point that the wheels 15 are normally raised from the ground when the members 9 are in a horizontal position such as shown in Figs. 1, 6 and 8. An L-shaped hollow member 17 is arranged substantially midway between the members 9 and one end thereof normally projects vertically and is adapted to receive a lever arm 18 (Fig. 1), while the opposite end projects forwardly and is adapted to be coupled to the forward wheeled section 7 in a manner to be referred to hereinafter.

Referring to Figs. 1, 2 and 7, it will be noted that the central clamping section 6 consists of a pair of upper and lower longitudinal bars 20 arranged on opposite sides of the tree trunk 1. Each longitudinal bar is formed by fastening two channel members back to back and in spaced relation to define a longitudinal slot therebetween. One end of these channel members is adapted to fit loosely within the ends of the members 9 and may be retained therein by suitable bolts 21 extending transversely therethrough. A shown in Fig. 1, these bolts may be engaged in any of a series of apertures 22 to permit the longitudinal members to project at varying distances dependent on the diameter of the earth ball 4. The outer ends of the members 20 are adapted to be tied together transversely by rods 23 and each side pair of members is tied vertically by rods 24 and a turn buckle 25 which serve to clamp the earth ball 4 between the members 20.

In Figs. 8 and 9 I have illustrated a slightly modified form of central clamping section. In this form of my invention, the lower clamping members are in the form of arcuate knives 28, the latter being illustrated as broad faced flat plates mounted on beams, each of which latter is pivoted at its rear end 29 in a hollow box sleeve 30 that is adapted to be received in the members 9. If desired, one or both of the knives 28 may be provided with radially inwardly projecting teeth 31. The outer ends of these members are adapted to be connected by an adjustable tie rod so that the knives may be drawn toward each other and thus sever to a large extent the earth beneath the tree roots. The upper clamping bars for this form of my invention are similar to those described in connection with Figs. 1, 2 and 7.

The forward wheeled section 7 is shown in Figs. 3 and 4 and consists of an axle 35 having a towing yoke 36 fastened to and projecting forwardly therefrom. Pivotally connected to the axle and projecting rearwardly therefrom is a pair of spaced channel irons 37 which are connected together for a portion of their length by a plate 38. The channel irons 37 are preferably spaced apart a distance equal to the width of the hollow member 17 and adapted to be coupled thereto by bolts 39 or other suitable fastening means. Suitable angle iron braces 40 are fastened to members 37 and project rearwardly and are adapted to be connected to members 9 by bolts 41 or similar fastening elements.

In use, a circular trench 2 as described above is dug about the tree and at diametrically opposite points the earth is removed to permit the rear section 5 and central clamping section 6 to be placed in position about the earth ball 4, as shown in Figs. 1 and 2. The clamping members 20, 20 are secured to the rear section and are securely clamped about the earth ball, as previously described. Lever arm 18 is then inserted in hollow member 17 and by means of a block and tackle, windlass or other mechanism, (not shown) connected to the upper end of lever 18, the tree is rocked about the rounded portions of U-shaped members 9 until the wheels 15 engage the ground, whereupon the axle forms the fulcrum. When the tree has been raised a suitable distance, the forward wheeled section 7 is coupled thereto by connecting braces 40 to members 9 and the channel members 37 to hollow member 17. Referring to Fig. 3, it will be noted that adjustable braces 45 are also connected between the front axle 35 and the outer ends of lower clamping members 20. These braces serve to hold the tree in elevated position on the truck assembly and when in position, the block and tackle may be disengaged from lever 18. Suitable truss cables 46 may be connected between the lever 18 and the outer ends of the upper clamping members 20 and these are preferably placed in position before the tree is initially raised, in order to balance the forces exerted in raising the tree.

With the tree in the position shown in Fig. 3, it may be towed to its new location and lowered in position in reverse order from that above described in connection with raising the tree.

In Figs. 10-13 inclusive, I have shown a slightly modified rear section wherein the axle is adjustable vertically to facilitate handling trees having earth balls of varying depths. In this form of my invention, I have shown the rear axle 50 as being slidable vertically between suitable guides 51 that interconnect the upper and lower portions of the U-shaped member 9ª. A bearing block 52 engages each end portion of the axle and these bearing blocks are slidably mounted in the guides 51. Suitable screws 53 engage the bearing blocks and serve to adjust the height of the rear section with respect to the ground. In other respects the parts are substantially similar to those already described.

In Figs. 14-16, I have shown a further modification of the rear section. In this form of my invention the substantially U-shaped members 9ᵇ are formed with rounded bottoms 55 and upwardly and rearwardly directed portions 56 which are fitted with plates 57, each of which is provided with a plurality of transverse slots 58. An axle 59 is journaled in bearing blocks 60 which may be bolted to the plates 57 at various heights from the ground. In other respects, this section is substantially identical to those previously described.

What I claim is:

1. The method of moving a tree which consists in excavating the earth about the base of a tree to define an earth ball, clamping a support to the earth ball, tilting the support, earth ball and tree upwardly and into an inclined position, and transporting the tree in an inclined position while supported entirely by the earth ball.

2. A tree moving apparatus comprising a rear wheeled section, a central section, and a forward wheeled section, said central section having clamping means associated therewith adapted to engage the earth ball of a tree being moved.

3. A tree moving apparatus comprising a rear wheeled section, a central section, and a forward wheeled section, said sections being detachably connected together, and said central section having clamping means associated therewith adapted to engage the earth ball of a tree being moved.

4. A tree moving apparatus comprising a rear wheeled section and a central clamping section adapted to engage the earth ball of a tree being moved, means for rocking said sections about a horizontal axis to an inclined position, and a forward wheeled section adapted to be connected to and support said sections in inclined position.

5. A tree moving apparatus comprising a pair of transversely spaced and substantially U-shaped members, an axle interconnecting said members, bars detachably connected to the ends of said U-shaped member, said bars being adapted to engage the upper and lower surfaces of the earth ball of a tree being moved, and means for clamping said bars to said earth ball.

6. A tree moving apparatus comprising a pair of transversely spaced and substantially U-shaped members, an axle interconnecting said members, bars detachably connected to the ends of said U-shaped members, said bars being adapted to engage the upper and lower surfaces of the earth ball of a tree being moved, means for clamping said bars to said earth ball, means for rocking said U-shaped members and bars about a horizontal axis, to an inclined position, and a forward wheeled section adapted to be connected to and to support said members and bars in inclined position.

7. A tree moving apparatus comprising a wheeled section having upper and lower clamping bars projecting therefrom, the wheels of said section being normally disengaged from the ground when said bars are in a horizontal position, and means for rocking said section about a horizontal axis to an inclined position to engage the wheels with the ground.

8. A tree moving apparatus comprising a wheeled section having upper and lower clamping bars projecting therefrom, means for clamping said bars to the earth ball on opposite sides of the trunk of a tree being moved, means for rocking said bars about a horizontal axis to an inclined position, and a forward wheeled section adapted to be connected to and to support said bars in inclined position.

9. A tree moving apparatus comprising a wheeled section having upper and lower clamping bars projecting therefrom, means for clamping said bars to the earth ball on opposite sides of the trunk of a tree being moved, a lever connected to said wheeled section, means for exerting a force on said lever to rock said wheeled section about a horizontal axis to an inclined position, and a forward wheeled section detachably connected to and adapted to support said rear wheeled section in inclined position.

10. A tree moving apparatus comprising a wheeled section having upper and lower clamping bars projecting therefrom, means for clamping said bars to the earth ball on opposite sides of the trunk of a tree being moved, means for rocking said section about a horizontal axis to an inclined position, a forward wheeled section detachably connected to the rear wheeled section, and braces interconnecting said sections for supporting said rear wheeled section in inclined position.

11. In a tree moving apparatus, upper and lower clamping means spaced apart for clamping therebetween an earth ball with tree roots therein, and ground engaging means connected to said clamping means and on which the combined weight of the clamping means, earth ball and tree rests when the tree and earth ball are loosened from the earth.

12. In a tree moving apparatus, upper and lower clamping means spaced apart for clamping therebetween an earth ball with tree roots therein, and roadway engaging means connected to said clamping means and on which the combined weight of the clamping means, earth ball and tree rests when the tree is in transit.

13. In a tree moving apparatus, upper and lower clamping means spaced apart for clamping therebetween an earth ball with tree roots therein, and ground engaging means connected to said clamping means and on which the combined weight of the clamping means, earth ball and tree rests when the tree and earth ball are loosened from the earth, said lower clamping means carrying flat surfaced elements adapted to engage the under face of the earth ball.

14. In a tree moving apparatus, upper and lower clamping means spaced apart for clamping therebetween the earth ball with tree roots therebetween, and contracting means to pull together the upper and lower clamping means.

15. In a tree moving apparatus, spaced upper clamping means adapted to be located on opposite sides of an earth ball having tree roots therein and tree trunk projecting upwardly between said spaced means, spaced lower clamping means adapted to be located on opposite sides of such an earth ball and complementary to said upper clamping means, contracting means to pull together the upper and lower clamping means on opposite sides of the earth ball, and second contracting means for pulling together laterally and respectively the upper clamping means and the lower clamping means.

16. In a tree moving apparatus, support means having spaced elements for engaging the under surface of an earth ball at opposite sides thereof to support the weight of the ball and the tree roots therein, and contracting means engaging said support means to pull the elements thereof together beneath the earth ball.

17. In a tree moving apparatus, support means having spaced elements for engaging the under surface of an earth ball at opposite sides thereof to support the weight of the ball and the tree roots therein, earth severing means carried by said spaced elements of said support means, and contracting means cooperating with said support means and said earth severing means to pull the same together beneath the earth ball to thereby cut the earth beneath the tree while supporting the earth ball.

MILO G. COPLEN.